United States Patent [19]

Dettmann et al.

[11] 4,147,824
[45] Apr. 3, 1979

[54] MULTILAYER SEALS AND METHOD FOR THEIR PRODUCTION AND JOINING TO SEAL CARRIERS

[75] Inventors: Heinrich Dettmann; Ernst Uhl, both of Ingelfingen, Fed. Rep. of Germany

[73] Assignee: Bürkert GmbH, Ingelfingen, Fed. Rep. of Germany

[21] Appl. No.: 783,513

[22] Filed: Mar. 31, 1977

[30] Foreign Application Priority Data

Mar. 31, 1976 [DE] Fed. Rep. of Germany ....... 2613658
Mar. 11, 1977 [DE] Fed. Rep. of Germany ....... 2710614

[51] Int. Cl.$^2$ ................................................ B32B 3/02
[52] U.S. Cl. .................................... 428/65; 92/103 R; 92/103 SD; 428/223; 428/304; 428/305; 428/321; 428/422
[58] Field of Search ...................... 428/64, 65, 66, 304, 428/306, 421, 422, 320, 305, 223, 321, 322; 92/103 SD, 103 R

[56] References Cited

U.S. PATENT DOCUMENTS

| | | | |
|---|---|---|---|
| 2,808,484 | 10/1957 | Beck et al. | 92/103 SD |
| 2,867,241 | 1/1959 | Fitz-Harris | 92/103 SD |
| 2,951,721 | 9/1960 | Asp | 428/320 |
| 3,048,537 | 8/1962 | Pall et al. | 428/320 |
| 3,134,571 | 5/1964 | Boteler | 92/103 R |
| 3,202,733 | 8/1965 | Strauss | 428/422 |

Primary Examiner—William J. Van Balen
Attorney, Agent, or Firm—Edwin E. Greigg

[57] ABSTRACT

Plastic seals for use in valves which handle chemically reactive and aggressive media are described. These seals have a base layer made from porous PTFE and a covering layer of smooth, dense PTFE. The two layers are suitably sintered together. The seal is held in a seal holder which may be injection molded around the seal and may be made from a similar material. During the production of the base layer, the PTFE material is mixed with a flushable filler material which leaves a structure of pores in the layer after removal. These pores impart to the base layer an elastic property.

A method for joining the seal to the seal carrier and a method for forming annular seals are also described.

6 Claims, 12 Drawing Figures

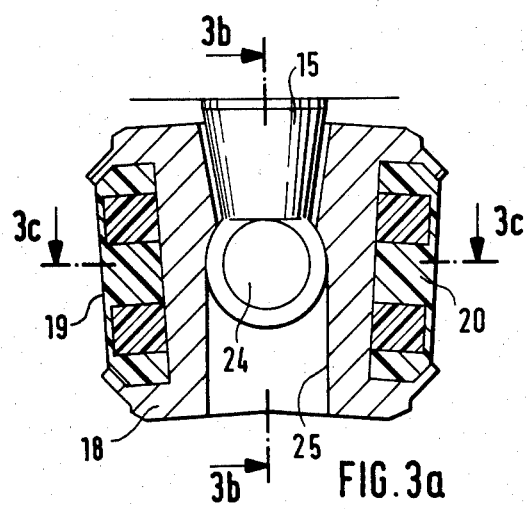
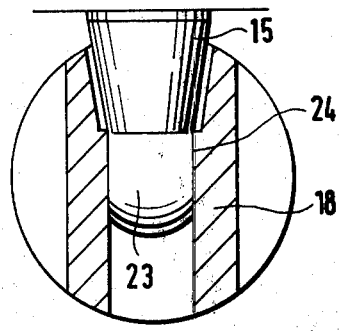
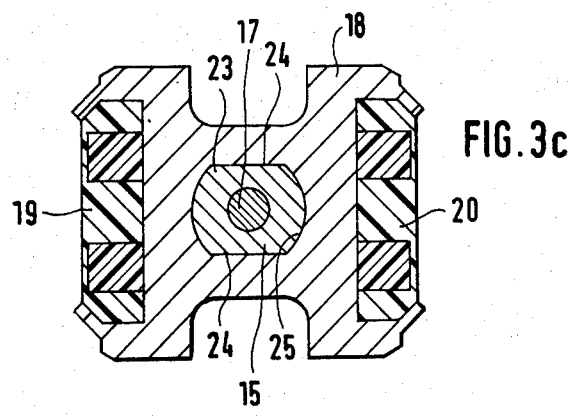

MULTILAYER SEALS AND METHOD FOR THEIR PRODUCTION AND JOINING TO SEAL CARRIERS

BACKGROUND OF THE INVENTION

The invention relates to disc-shaped or annular seals held by a seal carrier in valves which handle chemically aggressive substances. The seals to which this invention especially relates are multi-layer seals having a sealing surface consisting of PTFE (polytetrafluoroethylene) and an elastic lower layer. The invention further relates to a method of manufacture of seals of the above-described type as well as a method for joining seals of the type described to a seal carrier, i.e., a valve closing member or valve seat.

In valves which are to be used for chemically reactive or aggressive substances and in which the valve drive mechanism and the valve housing are two separate but coupled units, these units are sealed from one another hermetically by a sealing element which can resist the chemically aggressive substances, and a valve closing element which is actuated by the valve actuating mechanism has a seal which is also resistant to the action of the aggressive medium and which opens and closes the valve seat.

In previously known valves employed for handling aggressive media, the seals were mostly homogeneous seals made from solid PTFE or some elastomer which resisted aggressive media and in which the seal was a structural part of the valve closing member.

One disadvantage of seals made from solid PTFE, which does not have an elastomeric quality, is that their sealing function is less effective than that of seals made from elastomers. This disadvantage becomes especially noticeable when the valve seat and the seal are subjected to strenuous service, for example due to very rapid valve opening cycles, or due to a soiling of the medium being handled. As a result, these seals may perhaps be regarded as being fluid-tight but certainly not gas-tight. The above-described disadvantages are especially noticeable in valves which are switched with a low control force, for example magnetically actuated, direct-acting valves.

On the other hand, seals made from an elastic material, i.e., an elastomer, are not generally capable to resist chemically aggressive media so that valves equipped with such elastomer seals cannot be used for handling any and all media.

It has been known in the art to cover objects made from an elastomeric material with a layer of PTFE, for example as described in U.S. Pat. No. 3,511,682 and U.S. Pat. No. 3,514,314. A layer of PTFE of this type was not suitable heretofore in valve seals for aggressive media because of the high permeability of PTFE which permitted the aggressive medium to penetrate it by diffusion and to attack the interior elastomer portion chemically.

It has also been known to improve the resiliency of diaphragms used for electric switch actuation by making a laminate of a layer of PTFE covered glass fiber web and another layer of pure PTFE without fusing the two layers, e.g., as described in British Pat. No. 811,818.

OBJECT AND SUMMARY OF THE INVENTION

It is a first object of the invention to provide a seal made from a universally resistant material, i.e., PTFE, which is to be used as a valve seal and provides a high sealing reliability for both gaseous and liquid media even when the closing forces of the valve are relatively low. It is a further object of the invention to provide a seal which is relatively unaffected by soiling and contamination and which maintains its effectiveness at high valve cycling rates. Yet another and major object of the invention is to provide a valve seal made only of PTFE which exhibits an elastic behavior approximating that of an elastomer.

The foregoing objects of the invention are attained by providing a seal including a multi-layer configuration in which a lower layer made from PTFE has the elastic properties of rubber or an elastomer and that this property is conferred to it by a porous construction.

In a further embodiment of the invention, the sealing surface which is made from PTFE and the porous PTFE lower surface are sintered together.

In one embodiment of the invention, the lower layer is porous only in an annular region whereas its remaining portions which are employed to join the entire seal to the seal-carrying valve member are made from non-porous, homogeneous PTFE.

The seal may be joined to its carrier by providing the carrier with appropriate recesses or grooves in which the seal is mounted. Yet again, the seal may be held by providing a border or crimp on the seal carrier for holding the seal or yet again, by providing mechanical means, for example a screw, which penetrates its center and joins it to the carrier. The latter two possibilities are especially suitable if the lower portion of the seal is porous only in an annular region forming the valve sealing surface.

Because the seal according to the present invention exhibits an elastic property, i.e., it acts as a quasi-elastomer, the sealing property is insured even when the closing forces are relatively low. Furthermore, the seal according to the invention is capable of performing when a higher than previously acceptable amount of dirt is embedded in its surface. It is a further advantage of the seal of the present invention that, even when the seal is pressed with great force against the valve seat, no deformation of the porous base toward the center of the seat takes place.

A second set of objects of the present invention includes a method for producing a seal consisting entirely of PTFE and having a foil-like, smooth top surface which provides the sealing function and having a lower layer which is porous and which provides an elastic, quasi-elastomeric characteristic. It is a further object of the invention to provide a method for making a seal of this type in which the lower porous layer may be combined in simple and inexpensive manner with a carrier element, for example a valve closing member or a valve seat.

These latter objects are attained, according to the invention, by placing pure sinterable PTFE powder into a mold which corresponds in shape and thickness to the seal to be produced and to carry out a first pressing in which this powder is compressed into a homogeneous thin PTFE layer. In a second step, there is placed on top of this layer a mixture of sinterable PTFE powder and a filler material which is to provide pores and which may washed out of the substance after sintering. This mixture is compressed in a second pressing. In a third step, the two-layered material is sintered in a manner known for PTFE, whereafter the filler material is flushed out.

The sintering may be performed in known manner by pressure sintering or sintering with post pressure, processes which produce a particularly dense and non-porous surface layer. It is known that sintering in molds results in a long and expensive process. For this reason, the equally known free-form sintering would be preferable in the sintering of the above objects.

The filling material for the mixture used in the second step is suitably a water-soluble but non-hygroscopic material which is washed out after sintering. A suitable material may be for example potassium choride (KCl). In particular, if a porous sub-layer of at least 2 mm thickness is required, the grain size of the filler material is between 0.25 and 0.5 mm in diameter. Useful results have been obtained in a weight ratio of the PTFE powder and potassium chloride in the range of 0.4 to 0.6. During the pressing, the material to be compressed in both steps was exposed to a minimum pressure of 300 bar. The PTFE powder and the flushable filling material were mixed in a wobbling mixer.

In a further refinement of the method for producing this seal according to the invention, the PTFE powder which is to be mixed with a flushable filler to produce the lower, elastic layer is subjected to an electrostatic discharging process, suitably provided by stirring with a stirring rod charged to a high potential. The removal of electrostatic charge accumulations substantially prevents any lumping of the PTFE powder and thus enhances the intimate mixing.

It is known in the textile industry to discharge webs of material in similar manner. In the present case, it is suitable to use a coreless high voltage transformer, the secondary winding of which is grounded at one end and connected to the stirring rod at the other end. The stirring rod is insulated and may be a simple cylindrical rod. The high voltage of the secondary winding of the transformer is thus applied between the stirring rod and the grounded PTFE powder. The resulting high electric field causes discharges which ionize the air and permit the neutralization of static charge accumulations in the powder. The power required for the discharges is provided by the primary winding of the transformer.

A further distinct object of the invention is to provide a method for joining seals such as previously described with a valve closure member or a valve seat, i.e., with a seal carrier. It is a particular object of the present invention to make such a joint simple and to avoid any threaded engagements, crimps or recess couplings. It is an additional object of the invention to provide an intimate joint between adjacent surfaces while conserving space and cost when compared to previously known methods for joining the seal to the seal carrier. These latter objects are attained, according to the invention, by producing the seal carrier in an injection molding step in which the seal is enveloped by the carrier material. In the injection molding step, the seal still contains the filling material which is later to be flushed out. When valves are used for handling aggressive substances, it would be advantageous to make the seal carrier element out of a resistant material, i.e., PTFE. However, the injection molding of PTFE is difficult and can be performed only under special and expensive conditions. Therefore, preferably, the seal carrier is made from an easily moldable PTFE variant, for example PFA (polytetrafluoroethylene with side chains of perfluroalkoxy), FEP (a copolymer of tetrafluoroethylene including hexafluoropropylene) or ETFE (ethylene-tetrafluoroethylene-copolymer). In a further development, the filler material is flushed out of the surface of the lower layer in those regions where it is to be surrounded by injection-molded material. The material used for the molding thus enters the pores which have been created by the flushing of the filler material and substantially improves the joint which the seal makes with the seal carrier and prevents any tearout or rupture of the seal from the valve closing member, e.g., when a stuck valve is opened. The fact that the injection molding material enters the pores of the lower layer also prevents any undesirable compression or deformation of the lower layer due to the injection molding pressure. In the molding process, the seal itself is placed in the mold as a kind of mold center and other elements may be inserted in the mold for providing access to lower parts of the seal which permits and enhances the flushing of the material which remains in the seal after molding. These voids which are created in the carrier material later permit a pressure equalization within the contiguous porous array in the lower layer of the seal. When pressed, the thickness of the lower layer is at least four times the dimension of the grain size of the filler material. If the injection molded material of the carrier has joined the seal properly, the overall characteristic of the seal is uniform and quasi-elastomeric. The covering foil of the seal is made at least 0.3 mm thick which is the minimum thickness that guarantees hermetic sealing.

The invention will be better understood as well as further objects and advantages thereof become more apparent from the ensuing detailed description of several embodiments of the seal made according to the invention.

BRIEF DESCRIPTION OF THE DRAWING

FIGS. 3a to 3c are sections through the valve closing member shown in the embodiment of FIG. 2.

DESCRIPTION OF THE PREFERRED EMBODIMENTS

Figure 1:
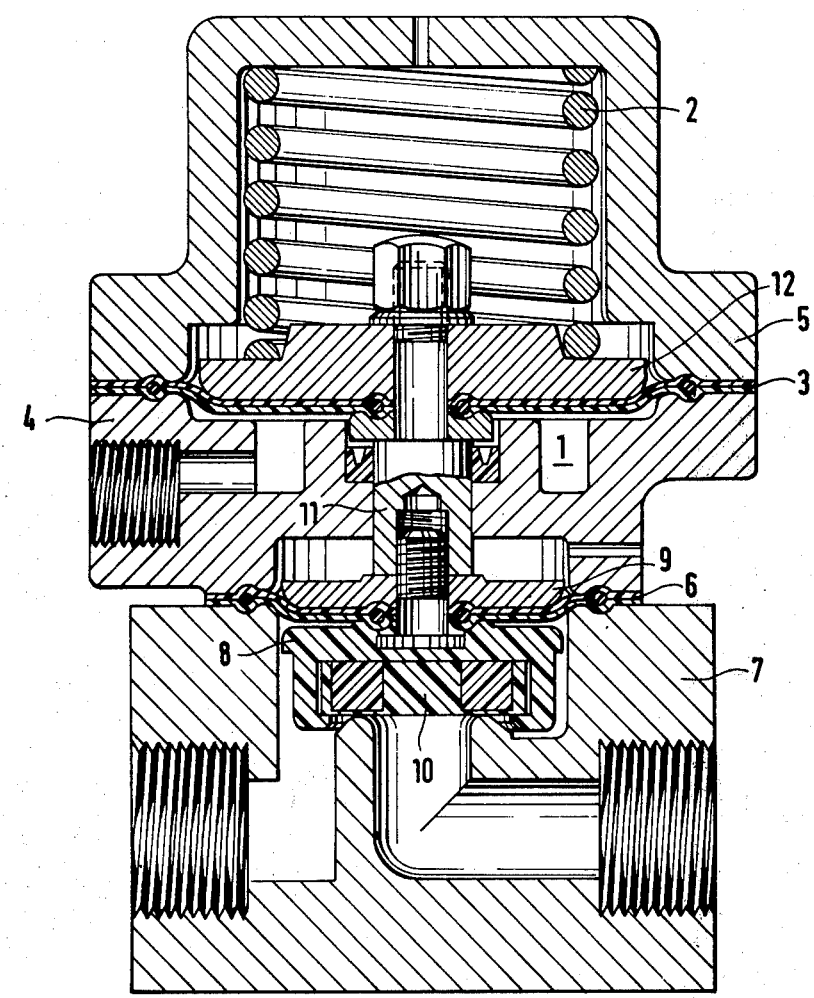
FIG. 1 is an axial section through a diaphragm valve incorporating a valve seat seal according to the present invention.

Turning now to FIG. 1, there is seen a diaphram valve of known construction shown in the closed position of the valve. The illustrated valve is intended to be actuated pneumatically or hydraulically and is closed when a pressure chamber 1 is not pressurized while it is open if the pressure chamber 1 is subjected to suitable pressure. A biased closure spring 2 insures closure of the valve in the absence of actuation pressure. A threaded clamping mechanism, which is not shown, fixes a control diaphragm 3 between an intermediate housing portion 4 and a valve top 5. The main valve seal diaphragm 6 is made from PTFE and is clamped between a lower housing portion 7 and the intermediate valve housing portion 4. The valve seal diaphragm 6 and the control diaphragm 3 cooperate in the manner illustrated with a valve disc 8, a support disc 9, a valve shaft 11, the intermediate housing portion 4 and a support 12 of the control diaphragm 3 to form a single unit. The quasi-elastomeric valve seat seal 10 which is produced by sintering is clamped in a valve disc 8 which may be made from PTFE or an injection moldable material such as PFA or PTFE by overlapping edges thereof.

Figure 2:
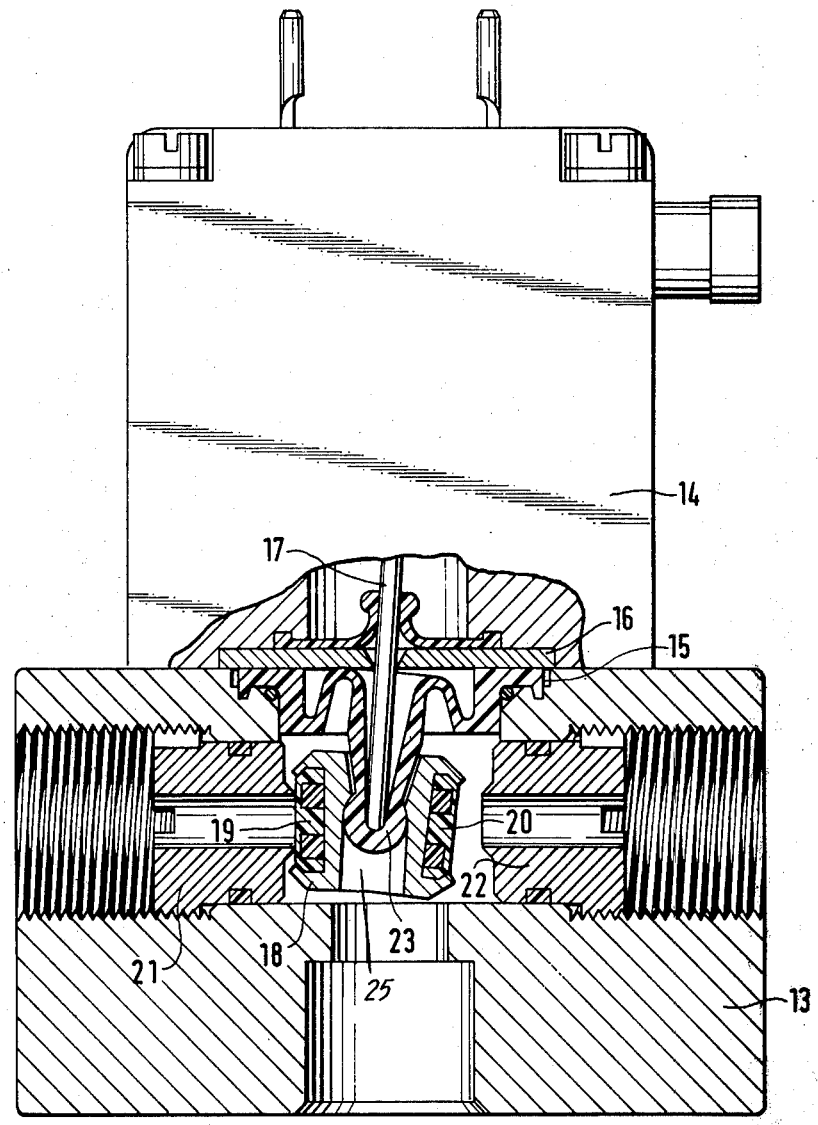
FIG. 2 is an axial section through a three-way valve having a wedge shape valve closing member equipped with a seal made according to the present invention.

The exemplary valve illustrated in FIG. 2 and in more detail in FIGS. 3a-3c includes the valve housing 13 and the valve actuating mechanism 14 which are sealed from one another by a flexible element 15 made from PTFE. Details of the valve actuation mechanism 14 are not shown and it may be electromagnetic, pneumatic, hydraulic or mechanical. The actuating mechanism engages a pivotably mounted actuating lever 17 anchored in a support plate 16 which in turn actuates the flexible element 15 causing its spherical end 23 to cooperate with one or the other of two valve seats by means of two quasi-elastomeric PTFE seals 19, 20 which are made according to the present invention. It will be understood that the valve opens and closes the opposing seats in mutually alternating manner.

In this exemplary embodiment, illustrated in FIG. 2, the valve closing member 18, itself made of injection moldable fluoro-plastic, is snapped over the end of the flexible member 15 which has lateral flattened portions 24. The form-fitting manner of association of the flexible member 15, i.e., the partially spherical and partially flattened end 23 with a cavity 25 in the valve closing member 18, insures their relative alignment and in particular prevents mutual rotation in the three main axes. The overall angular alignment of the valve closing members is seen to be non-parallel, i.e., their mutual angle is chosen to conform to the actuation angle of the lever 17 so that only a very short pendulum motion is required on its bearing surface 23; the possibility for executing these short angular motions is provided by a very small tapered void between the closure member 18 and the flexible element 15 above the tip 23.

Figure 4:
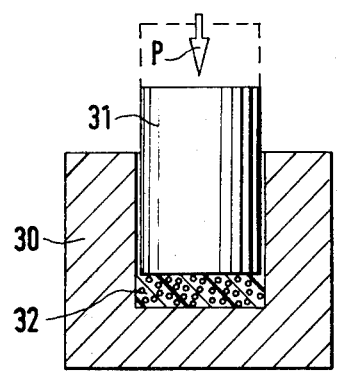
FIGS. 4 to 10 are schematic drawings illustrating the steps of the method for producing the seal according to the invention and the method for joining the seal with a carrier member of special construction.

The method for producing the seal according to the invention is illustrated in FIG. 4 where there is shown a hydraulic press 30 of known construction which receives a hydraulically driven ram 31 for compressing a charge of powdered PTFE 32. The force P of the press is so chosen as to produce a minimum pressure of 300 bar in the charge 32.

Figure 5:
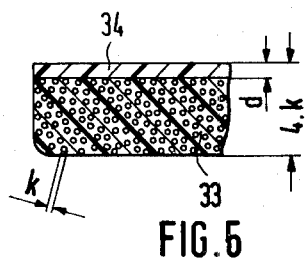

The double layered seal which is produced, as already described, in two consecutive steps, is illustrated in FIG. 5 and includes a porous sub-layer 33 and a foil-like smooth upper surface layer 34. The thickness of the surface layer d may suitably be approximately 0.3 mm and the average pore diameter B in the layer 33, which is approximately equal to the grain size of the flushable filling material, is approximately ¼ as large as the minimum thickness of the entire seal which is seen to be 4k. If the sub-layer is 4 mm thick while the top layer is 0.3 mm thick, and if the production pressure is 300 bar, it has been found that the surface of the top layer 34 has a Shore hardness of 80 Shore A and thus corresponds with that of a seal made from an elastomeric material.

Figure 7:
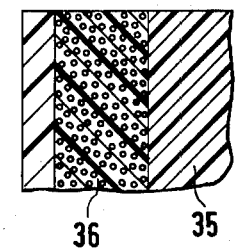
Figure 6:
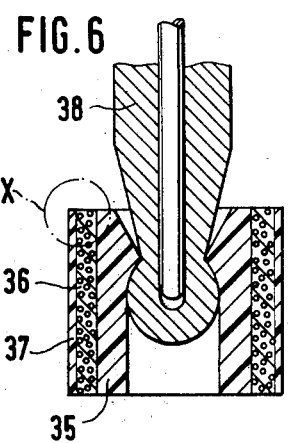
Figure 8:
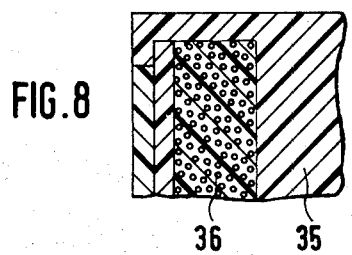
Figure 9:
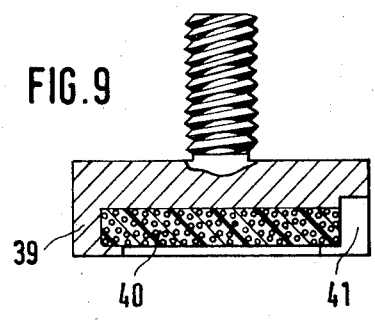
Figure 10:
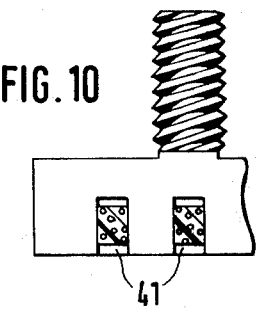

FIG. 6 is a cross section of a seal carrier 35, i.e., a valve seal carrier, each of the two faces of which is provided with a two-layer seal 36, 37 made from PTFE according to the method of the present invention. These seals are joined to the carrier by injection molding material into a mold which contains seals 36 and 37 in the appropriate locations. If the valve is intended for low pressure operation, the carrier material need not surround the seal, whereas, if the valve is intended for high pressure operation, the carrier material suitably surrounds and holds the seal. In the former case, the point x in FIG. 6 is shown enlarged in FIG. 7, whereas FIG. 8 illustrates the point x in enlarged fashion for the second case, i.e., in which the carrier body surrounds the seal. The valve closing member 35 is engaged by an actuating element 38 which permits pivoting the closure member to and fro, causing the alternating contact of the seal 36 or the seal 37 with its corresponding seat. By contrast to this embodiment, FIGS. 9 and 10 illustrate a seal carrier 39 which executes axial motions but which surrounds the seal 40 in a manner illustrated in FIG. 8 with respect to the seal 36. The portion of the seal carrier 39 which surrounds the seal 40 is provided with recesses 41 so as to permit flushing out the finally distributed filling grains located in the lower layer of the seal after injection molding takes place.

A useful type of seal which may also be produced according to the present invention is a seal which is porous only over an annular portion. The above-described method for producing a seal having a uniformly porous sub-layer is changed in the following manner to produce the annular seal. In a first step, the cover layer is produced by compressive forces exceeding 300 bar. The annular insert which is intended to be porous in the final state is produced in a separate mold from a mixture of sinterable PTFE powder and a filling material which is to be flushed out subsequent to sintering for the formation of pores, at a pressure below 300 bar, approximately 200 bar, as is the core and covering portion of the seal. In a final pressing step, the three parts are joined together in the mold already used for producing the covering foil. For this purpose, the previously compressed inserts are placed on the cover foil in the mold and are joined to them by pressures exceeding 300 bar. In this final step, the inserts are reduced in volume by less than one percent. Flushing out the filler material is easier if the rim of the annular insert is available to the flushing fluid as well as its inside surface. For this purpose, channels are suitably provided in the solid PTFE core and cover during the first and final pressing or after the final pressing. Suitably, these channels penetrate the solid portion axially or radially until they reach the region containing the flushable material. This procedure is required if the face of the porous annulus is partially covered up due to the surrounding carrier material or because of a special covering foil which is produced in one piece as a junction disc during the production of the core and covering portion of the seal.

The foregoing relates to preferred exemplary embodiments of the invention, it being understood that other embodiments and variants thereof are possible within the spirit and scope of the invention.

What is claimed is:

1. A circular, multi-layer seal for closing valve seals of valves handling aggressive media, said seal being held by a valve seat seal carrier, comprising:
   a base layer of PTFE material provided with a plurality of internal voids which impart to it a rubber-like elasticity; and
   a foil-like smooth, tight surface layer of PTFE material disposed on said base layer and constituting the sealing surface of said seal.

2. A seal as defined by claim 1, wherein said surface layer and said porous base layer after separate compression are joined by sintering.

3. A seal as defined by claim 1, wherein said base layer has internal voids only in an annular region whereas the remaining regions which serve for joining said seal to a structural valve member consist of non-porous, homogeneous PTFE material.

4. A valve seat seal carrier member of a valve for handling chemically aggressive substances, having a recess which holds a seal as defined by claim 1.

5. A valve seat seal carrier member as defined by claim 4, wherein said seal is held by bent edges thereof.

6. A movable valve seat seal carrier member for use in a valve carrying chemically aggressive substances, said valve seat seal carrying member being provided with a seal as defined by claim 1, said base layer being porous only in an annular region, remaining portions of said base layer being made from non-porous homogeneous PTFE, and said seal being attached to said valve seat seal carrier member by a central screw penetrating said seal and entering said valve seat seal carrier member.

* * * * *